United States Patent Office 3,363,403
Patented Jan. 16, 1968

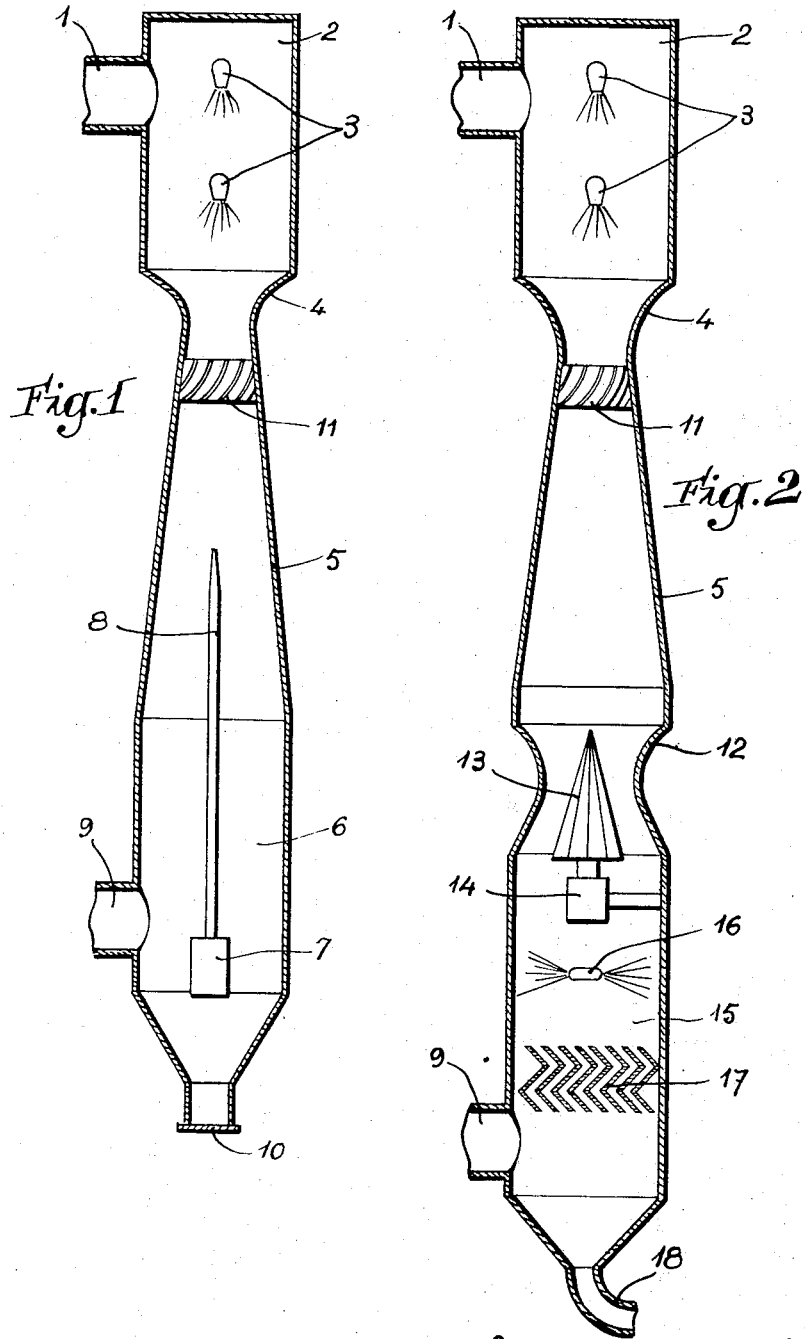

3,363,403
ELECTROSTATIC FILTERING APPARATUS
Pierre Georges Vicard, 15, Cours Eugenie,
Lyon, Rhone, France
Filed Nov. 19, 1964, Ser. No. 412,471
Claims priority, application France, Dec. 2, 1963,
44,234, Patent 1,386,506
2 Claims. (Cl. 55—122)

This invention relates to electrostatic filtering apparatus for the removal of dust-laden gases, of the kind comprising a Venturi tube in which the gas, previously saturated with the vapour of a liquid and supersaturated with a mist of fine droplets of this liquid, is submitted to a sudden expansion which lowers its temperature to such an extent that the vapour carried by the gas condenses on the dust particles in the form of a superficial liquid film, the wet particles being thereafter ionized by a central ionizing electrode. Owing to the state of supersaturation of the gas the liquid film formed on the dust particles does not evaporate immediately in the diverging portion of the Venturi tube and the ionized dust particles, which are now in the form of droplets with a solid core, are easily precipitated. The axial ionizing electrode is conveniently disposed in the diverging portion of the Venturi tube itself in order to act on the wet particles in the immediate vicinity of the neck of the Venturi.

The apparatus of the kind above referred to are generally satisfactory. However the voltage which can safely be applied to the ionizing electrode should not be too high in order to avoid arcing between the said electrode and the walls of the filter. This drawback results from the presence of the liquid droplets of the supersaturating mist carried by the gas and also of the wet dust particles. Owing to this relatively low voltage, the ionization of the dust particles is not effected under the most favourable condition and consequently their precipitation may be incomplete.

The present invention has for its object to avoid this disadvantage. In accordance with this invention an electrostatic filtering apparatus for the removal of dust from dust-laden gases, of the kind above referred to, comprises means for imparting a high velocity rotational motion to the gas in the diverging portion of the Venturi tube in order to urge the liquid droplets and the wet particles from the central zone which surrounds the ionizing electrode towards the outer wall of the Venturi tube.

The means for imparting a high velocity rotational motion to the gas in the diverging portion of the Venturi tube may comprise a circular set or row of helicoidal vanes preferably disposed close to the neck of the Venturi tube.

In an embodiment of the invention the central ionizing electrode is mounted in a secondary Venturi tube disposed adjacent the outlet of the diverging portion of the main Venturi tube so as to receive the whirling gas issuing therefrom.

The electrostatic filtering apparatus according to the invention may further comprise a gas scrubbing device having its liquid sprayer disposed immediately downstream of the central ionizing electrode.

In the accompanying drawing:

FIG. 1 is a diagrammatical longitudinal section of a first embodiment of an apparatus according to the invention, the said apparatus comprising a single central electrode which protrudes substantially into the diverging portion of the Venturi tube.

FIG. 2 illustrates a second embodiment in which the central electrode is disposed within a secondary Venturi tube mounted in series with the main one.

Referring to FIG. 1, reference numeral 1 designates the dust-laden gas inlet. This inlet opens into an upper chamber 2 within which are disposed spraying devices 3 adapted to saturate the gas with steam and to supersaturate it with a mist of fine liquid droplets. The lower end of this chamber 2 is connected with the inlet of the converging portion 4 of a Venturi tube, the diverging portion 5 of which opens into an elongated collecting chamber 6 in which is disposed the support 7 of a rectilinear axial ionizing electrode 8. This electrode 8 protrudes into the diverging portion 5. The collecting chamber 6 has a lateral outlet 9 for the filtered gas, while its bottom comprises an appropriate discharge device 10 (air lock, valve, etc.) through which it is possible to extract the dust-laden liquid which collects in the said chamber 6.

Immediately below the neck of the Venturi tube 4–5 there is provided a circular set of row of vanes 11 adapted to impart a high velocity rotational motion to the gas about the vertical axis of the Venturi tube.

The apparatus described operates as follows:

The incoming dust-laden gas from the gas inlet 1 is entirely saturated with steam within the upper chamber 2 and it is further supersaturated with a mist of fine liquid droplets. During its passage through the neck of the Venturi tube, a substantial portion of the static pressure of the gas is transformed into dynamic pressure, i.e. into kinetic energy, owing to the considerable increase of the velocity of the gas. This transformation or expansion of the gas takes place adiabatically and it has for its result a sudden drop of temperature which causes an important condensation of water on the dust particles entrained by the gas. These particles thus become covered with a thin water film and behave as liquid droplets having an inner solid core. The vanes 11 impart to this mixture of gas, of steam, of fine liquid droplets and of liquid droplets with an inner solid core a high velocity rotational motion about the axis of the tube, the said mixture thus following in the diverging portion 5 of the Venturi tube a downwardly directed helicoidal path. The resulting centrifugal force therefore urges the liquid droplets against the wall of the diverging portion 5 from the central zone thereof and therefore the average amount of moisture is correspondingly reduced around the ionizing electrode 8 which is situated at a distance from vanes 11, downstream of the latter. The risk of an arc taking place between this electrode and the said wall is therefore smaller and the electric voltage applied to the said electrode may be increased. The electrostatic field produced by this high voltage ionizes the fine water droplets as also the solid particles covered with a water film, thus enhancing their tendency to precipitate against the wall of the Venturi tube. The droplets form on the said wall a continuous liquid film which flows downwardly together with the dust particles entrained. This liquid with solid particles in suspension collects in the lower end of the collecting chamber 6 from which it may be evacuated through the discharge device 10 when desired.

In the embodiment of FIG. 2 there is provided a secondary Venturi tube 12, of relatively short length, disposed immediately downstream of the main Venturi tube 4–5. The central ionizing electrode 13 is mounted axially within this Venturi tube 12, the said electrode being realized in the form of a conical network supported by an appropriate support 14.

The secondary Venturi tube 12 opens into a lower collecting chamber 15 which houses a conventional gas scrubber comprising a sprayer 16 adapted to cooperate with precipitating surfaces 17. The filtered gas outlet 9 opens below surfaces 17, while the lower end of the collecting chamber 15 is connected with an appropriate discharge device which, in the example illustrated, is realized in the form of a conduit 18.

The operation is substantially as described with reference to FIG. 1, with this difference that the ionizing electrode 13 is situated in a zone in which the gas is submitted to a second expansion and to a second transient cooling, and in which therefore dust particles are more surely surrounded with a water film while being urged towards the outer wall by centrifugal force, the latter being particularly high in the neck of the secondary Venturi tube owing to the reduced diameter thereof, it being recalled that in such a case the rotation of the fluid column takes place according to the so-called irrotational regime in which the linear velocity is inversely proportional to the radius of rotation. The sprayer 16 is situated in the electric field between the ionizing electrode 13 and the precipitating surfaces 17. It therefore attracts electrostatically the wet dust particles which may have escaped precipitation against the wall of the secondary Venturi tube 12.

I claim:
1. An electrostatic filter for the removal of dust particles from a dust-laden gas, comprising a casing having an upper chamber having an inlet for dust-laden gas and having an outlet; means in said chamber to saturate said dust-laden gas with a vapour of a liquid to obtain a saturated gas; means in said chamber to supersaturate said saturated gas with a fine mist of droplets of said liquid to obtain a saturated and supersaturated gas; a main Venturi tube connected with said outlet through which said saturated and supersaturated gas is caused to pass to be submitted to a sudden expansion causing condensation of said vapour on said dust particles in the form of a liquid film, said main Venturi tube having an axis, a converging inlet portion, a diverging outlet portion and an intermediate neck portion between said converging inlet portion and said diverging outlet portion; a secondary Venturi tube disposed downstream of said main Venturi and in line therewith and connected thereto to receive said saturated and supersaturated gas therefrom, said secondary Venturi tube also having an axis, a converging inlet portion, a diverging outlet portion and an intermediate neck portion; an ionizing electrode disposed substantially axially in said diverging outlet portion of said secondary Venturi tube to ionize said dust particles covered with a liquid film, said ionizing electrode extending through said neck portion of said secondary Venturi tube but terminating short of said diverging outlet portion of said main Venturi tube; means to impart a high velocity rotational motion to said saturated and supersaturated gas about the axis of said main Venturi tube in the diverging outlet thereof, said means being disposed close to said neck portion of said main Venturi tube in said diverging outlet portion thereof; means to collect the dust particles ionized by said electrode comprising a collecting chamber disposed downstream of said secondary Venturi tube and having a gas outlet and a discharge conduit; a gas scrubber in said collecting chamber; and precipitating surfaces in said collecting chamber disposed below the scrubber and above said gas outlet.

2. In an electrostatic filter as claimed in claim 1, said main Venturi tube and said secondary Venturi tube being disposed substantially vertically, each with its converging inlet portion above its diverging outlet portion.

References Cited

UNITED STATES PATENTS

| | | | |
|---|---|---|---|
| 2,315,226 | 3/1943 | Rohlin | 55—235 X |
| 2,594,805 | 4/1952 | Rommel | 55—127 |
| 2,740,493 | 4/1956 | Wintermute | 55—7 |
| 2,852,239 | 9/1958 | Vicard | 55—338 X |
| 2,935,375 | 5/1960 | Boucher. | |
| 2,983,332 | 5/1961 | Vicard | 55—5 |
| 3,177,634 | 5/1965 | Latham et al. | |

FOREIGN PATENTS

| | | |
|---|---|---|
| 662,537 | 12/1951 | Great Britain. |
| 792,588 | 4/1958 | Great Britain. |
| 851,555 | 10/1960 | Great Britain. |
| 870,812 | 6/1961 | Great Britain. |
| 884,750 | 12/1961 | Great Britain. |
| 908,043 | 10/1962 | Great Britain. |

HARRY B. THORNTON, *Primary Examiner.*

D. TALBERT, *Assistant Examiner.*